US010554451B1

(12) United States Patent
Stockmaster et al.

(10) Patent No.: US 10,554,451 B1
(45) Date of Patent: *Feb. 4, 2020

(54) SCALABLE SPACE FREQUENCY ADAPTIVE PROCESSING (SFAP)

(71) Applicant: Rockwell Collins, Inc., Cedar Rapids, IA (US)

(72) Inventors: Michael H. Stockmaster, Cedar Rapids, IA (US); Matthew J. Mueller, Cedar Rapids, IA (US); Christopher J. Hogstrom, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,024

(22) Filed: Mar. 18, 2019

Related U.S. Application Data

(63) Continuation of application No. 15/940,944, filed on Mar. 29, 2018, now Pat. No. 10,243,761.

(51) Int. Cl.
*H04L 25/03* (2006.01)
*H01Q 21/00* (2006.01)

(52) U.S. Cl.
CPC ....... *H04L 25/03006* (2013.01); *H01Q 21/00* (2013.01); *H04L 2025/03528* (2013.01)

(58) Field of Classification Search
CPC .... H04L 25/03006; H04L 2025/03528; H01Q 21/00
See application file for complete search history.

(56) References Cited

U.S. PATENT DOCUMENTS

| 6,724,344 B1 | 4/2004 | Stockmaster et al. |
| 10,243,761 B1* | 3/2019 | Stockmaster ..... H04L 25/03006 |
| 2006/0194544 A1 | 8/2006 | Struckman |

(Continued)

OTHER PUBLICATIONS

Non-Final Office Action for U.S. Appl. No. 15/940,944 dated Jul. 26, 2018. 6 pages.

(Continued)

*Primary Examiner* — Nguyen T Vo
(74) *Attorney, Agent, or Firm* — Donna P. Suchy; Daniel M. Barbieri

(57) ABSTRACT

Embodiments of the inventive concepts disclosed herein are directed to systems and methods for signal processing. An antenna array can receive signal information. A signal processing device can perform a time-domain-to-transform-domain transform with N transform domain bins, on the signal information. The signal processing device can determine N covariance matrices each corresponding to a respective one of the N transform domain bins. The signal processing device can group covariance matrices from the N covariance matrices into groups of M covariance matrices. Each group can correspond to a respective group of M adjacent bins from the N bins. The signal processing device can produce a combined spatial covariance matrix for each group of M covariance matrices, by performing a weighted combination of covariance matrices within the respective group of M covariance matrices. The signal processing device can calculate spatial weights from each of the spatial covariance matrices, for anti-jamming processing.

20 Claims, 2 Drawing Sheets

(56) References Cited

U.S. PATENT DOCUMENTS

2008/0025200 A1    1/2008   Tiirola et al.
2018/0083660 A1    3/2018   Van Houtum

OTHER PUBLICATIONS

Notice of Allowance for U.S. Appl. No. 15/940,944 dated Nov. 15, 2018. 7 pages.
Parker, Michael; "Radar Basics—Part 4: Space-time adaptive processing", EE|Times; Jun. 28, 2011. 11 pages.

* cited by examiner

SCALABLE SPACE FREQUENCY ADAPTIVE PROCESSING (SFAP)

RELATED APPLICATIONS

This application is a continuation of U.S. patent application Ser. No. 15/940,944 filed on Mar. 29, 2018, and entitled "SCALABLE SPACE FREQUENCY ADAPTIVE PROCESSING (SFAP)", which is incorporated herein by reference in its entirety for all purposes.

BACKGROUND

Many systems used in communications, surveillance or military applications for instance, use information received via communications signals or satellite signals. Frequently, such systems (e.g., global navigation satellite system (GNSS) receivers) may operate in the presence of interfering or jamming signals. To improve the reception and processing of such signals, anti-jamming capabilities are becoming increasingly useful or necessary to suppress or remove jammers or interference. However, anti-jamming systems are typically custom-designed to address a particular performance requirement, and cannot readily modify its level of anti-jamming processing. There are challenges to addressing this limitation efficiently and cost-effectively.

SUMMARY

In one aspect, embodiments of the inventive concepts disclosed herein are directed to a system for signal processing. The system can include an antenna array to receive signal information. A signal processing device can include one or more processors. The signal processing device can perform a time domain to transform domain transform (or TTT) with N transform domain bins (e.g., frequency bins), on the signal information. Examples of TTT can include Fourier transform such as fast Fourier transform (FFT), and wavelet transform. The signal processing device can determine N covariance matrices each corresponding to a respective one of the N transform domain bins (e.g., frequency bins). The signal processing device can group covariance matrices from the N covariance matrices into groups of M covariance matrices. Each group can correspond to a respective group of M adjacent transform domain bins from the N transform domain bins. The signal processing device can produce a combined spatial covariance matrix for each group of M covariance matrices, by performing a weighted combination of covariance matrices within the respective group of M covariance matrices. The signal processing device can calculate spatial weights from each of the spatial covariance matrices, for anti-jamming or interference mitigation processing to control the antenna array.

In some embodiments, and as an example, the signal processing device can perform a time domain to frequency domain transform (e.g., FFT) with N frequency bins, on the signal information. The signal processing device can determine N covariance matrices each corresponding to a respective one of the N frequency bins. The signal processing device can group covariance matrices from the N covariance matrices into groups of M covariance matrices. Each group can correspond to a respective group of M adjacent frequency bins from the N frequency bins. The signal processing device can produce a combined spatial covariance matrix for each group of M covariance matrices, by performing a weighted combination of covariance matrices within the respective group of M covariance matrices. The signal processing device can calculate spatial weights from each of the spatial covariance matrices, for anti-jamming or interference mitigation processing to control the antenna array.

In some embodiments, the antenna array can receive the signal information in a radio frequency (RF) signal. The system can further include an analog to digital converter (ADC) configured to convert an analog signal from RF circuitry coupled to the antenna array, into a digital signal. The signal processing device can perform the TTT on the digital signal. The antenna array can receive the signal information in a GNSS signal.

In some embodiments, the signal processing device can control the antenna array using a first value for M at a first time instance, and a second value for M at a second time instance. The signal processing device can set or receive a value for M in response to a level of interference detected in signals received via the antenna array. For instance, the value of M can be user controlled or automatically set in response to the type and level of interference detected in the signals. The system can further include an excision component configured to filter a result of the anti-jamming or interference mitigation processing, at a resolution matched to the N bins. The signal processing device can perform an inverse FFT (IFFT) with N bins. The antenna elements of the antenna array can be steered according to the anti-jamming or interference mitigation processing. The antenna elements of the antenna array can be controlled or steered using the calculated spatial weights.

In a further aspect, embodiments of the inventive concepts disclosed herein are directed to a method for interference mitigation. The method can include receiving signal information via an antenna array. A signal processor can perform a time domain to transform domain transform (TTT) with N transform domain bins (e.g., frequency bins, where the transform domain is a frequency domain), on the signal information. The signal processor can determine N covariance matrices each corresponding to a respective one of the N transform domain bins. The signal processor can group covariance matrices from the N covariance matrices into groups of M covariance matrices. Each group corresponding to a respective group of M adjacent transform domain bins from the N transform domain bins. The signal processor can produce a combined spatial covariance matrix for each group of M covariance matrices, by performing a weighted combination of covariance matrices within the respective group of M covariance matrices. The signal processor can calculate spatial weights from each of the spatial covariance matrices, for anti-jamming or interference mitigation processing, to control the antenna array.

In some embodiments, and as an example the signal processor can perform a time domain to frequency domain transform (such as FFT) with N frequency bins, on the signal information. The signal processor can determine N covariance matrices each corresponding to a respective one of the N frequency bins. The signal processor can group covariance matrices from the N covariance matrices into groups of M covariance matrices. Each group corresponding to a respective group of M adjacent frequency bins from the N frequency bins. The signal processor can produce a combined spatial covariance matrix for each group of M covariance matrices, by performing a weighted combination of covariance matrices within the respective group of M covariance matrices. The signal processor can calculate spatial weights from each of the spatial covariance matrices, for anti-jamming or interference mitigation processing, to control the antenna array.

In some embodiments, the antenna array can receive the signal information in a radio frequency (RF) signal. An analog to digital converter (ADC) can convert an analog signal from RF circuitry coupled to the antenna array, into a digital signal. The signal processing device can perform the TTT on the digital signal. The antenna array can receive the signal information in a global navigation satellite system (GNSS) signal. The signal processing device can control the antenna array using a first value for M at a first time instance, and a second value for M at a second time instance. The value for M can be set in response to a level of interference detected in signals received via the antenna array. An excision component can filter a result of the anti-jamming or interference mitigation processing, at a resolution matched to the N bins. The signal processing device can perform an inverse TTT (ITTT) with N bins. The antenna elements of the antenna array can be steered according to the anti-jamming or interference mitigation processing. The antenna elements of the antenna array can be steered according to the calculated spatial weights.

In yet another aspect, embodiments of the inventive concepts disclosed herein are directed to a global navigation satellite system (GNSS) device. The GNSS device can include an antenna array that can receive GNSS signal information. A signal processing device can include one or more processors. The signal processing device can perform a fast Fourier transform (FFT) with N frequency bins, on the GNSS signal information. The signal processing device can determine N covariance matrices each corresponding to a respective one of the N frequency bins. The signal processing device can group covariance matrices from the N covariance matrices into groups of M covariance matrices, each group corresponding to a respective group of M adjacent frequency bins from the N frequency bins. The signal processing device can produce a combined spatial covariance matrix for each group of M covariance matrices, by performing a weighted combination of covariance matrices within the respective group of M covariance matrices. The signal processing device can calculate spatial weights from each of the spatial covariance matrices, for anti-jamming or interference mitigation processing to control the antenna array.

In some embodiments, the signal processing device can control the antenna array using a first value for M at a first time instance, and a second value for M at a second time instance. The signal processing device can set or receive a value for M in response to a level of interference detected in signals received via the antenna array. The signal processing device can perform an inverse FFT (IFFT) with N bins.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
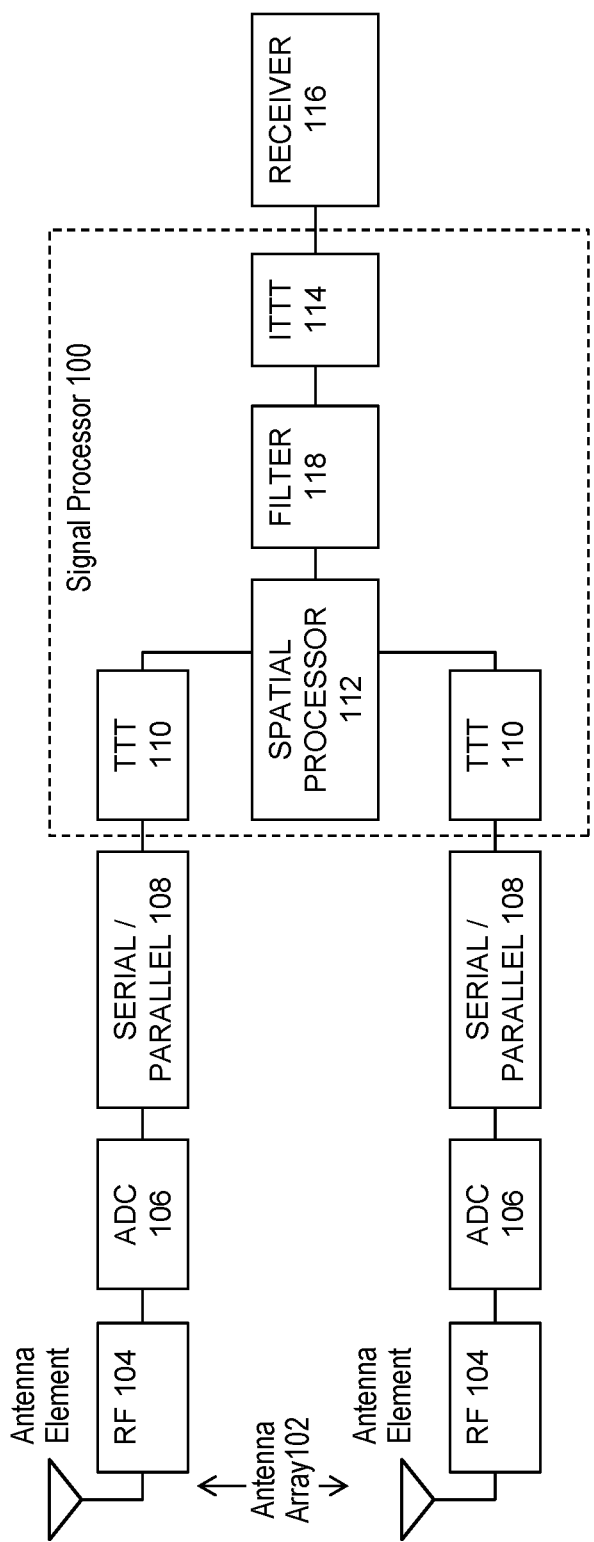
FIG. 1 is a block diagram of an example embodiment of a system for signal processing in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to systems and methods for signal processing that can include and extend on some aspects of space frequency adaptive processing (SFAP). SFAP can be used as an anti jam (AJ) technique that can be applied on any communications signals, such as GNSS based signals which can include GPS, GLONASS, Galileo, Beidou and other regional systems' satellite signals. AJ systems are typically implemented as point designs for mitigating specific threat scenarios that may be unique to each market (e.g., geographical region, or technology involved). SFAP is a technique that uses the Fast Fourier Transform (FFT) to subdivide a frequency band of interest into sub-bands. Adaptive spatial processing is then performed in each sub-band prior to re-combining with an inverse FFT. For SFAP, a high-end design might implement 256 FFT bins for instance, whereas a low-end design might implement 32 bins for example. While based on the same underlying FFT processing, these two example designs would typically be two distinct sets of software and firmware, to offer two different but fixed levels of performance. Instead of achieving different performance using distinct designs, embodiments of the present inventive concepts provide for systems and methods that allow for adaptable spatial processing for interference mitigation. For instance, the processing can be adapted to be less aggressive when the threat environment can be mitigated with less capable processing.

AJ approaches such as Spatial-only Adaptive Processing (SAP) or Space-Time Adaptive Processing (STAP) can provide a single covariance matrix that can be used to generate situational awareness information such as that associated with direction finding. The ability to perform spatial-only adaptive processing or to generate a single spatial covariance matrix to support direction finding is not available in conventional SFAP as the processing is done in the frequency domain. Spatial-only covariance generation and adaptive processing is available in accordance with some aspects of the inventive concepts disclosed herein, by setting M equal to N. In accordance with some aspects of the inventive concepts disclosed herein, the present systems and methods can use a time-domain to transform/other-domain transform (sometimes referred to herein as a TT transform or a TTT) with a number of bins subdivided from a transform domain band/range (e.g., frequency band) of interest, and can use one or more spatial covariance matrices to support situational awareness. A TTT can refer to a transformation from a time domain to another domain (sometimes generally referred to as a transform domain). Taking FFT as an example of TTT, FFT describes a transformation from time domain to frequency domain. Taking wavelet transform as one example of TTT, wavelet transform describes a transformation from time domain to a "scale" domain which is related to frequency, and/or to another time domain. TTT can also refer to a transformation from one time domain to another time domain. Accordingly, a transform domain can refer to any type of domain, such as frequency domain, wavelet "scale" domain, a certain time domain, and so on.

Referring to FIG. 1, one example embodiment of a system for signal processing is depicted. The system can include a signal processor 100, an antenna array 102 comprising one or more antenna elements, and/or radio frequency (RE) front end components 104 configured for receiving incoming RF signals. The incoming RE signals may be converted to digital signals through analog to digital converters (ADC) 106, and are then converted from a serial stream of data to a block of data in serial-to-parallel converters 108, for signal processing. The signal processor (sometimes referred to as a digital signal processor) 100 can include time-domain to transform-domain transform (ITT) engines 110, that can carry out a ITT such as a fast Fourier transform (FFT), in which N points are taken resulting in N frequency bins (or transform domain bins). A spatial processor 112 can establish covariance matrices for each of the N bins, and can establish a number of spatial covariance matrices, each obtained by performing a weighted combination of covariance matrices within a corresponding group of M covariance matrices. The spatial processor 112 can calculate spatial weights corresponding to each of the spatial covariance matrices. The spatial weights can be used to electronically and/or adaptively steer the antenna elements. The spatial weights can be used for anti-jamming or interference mitigation processing in the spatial processor 112, for example by combining with data from each of the antenna elements to perform spatial processing. Excision or filtering is optionally applied by an excision component 118 on an output of the spatial processor 112, after the spatial processing. An inverse TTT (ITTT) engine 114 can perform inverse TTT (e.g., inverse FFT) on an output of the spatial processor 112 or the excision component 118, to produce time domain data (e.g., GNSS based data such as C/A code, Y-code and/or M-code, or communications data). A receiver 116, such as a GNSS receiver or a communications receiver, can receive the time domain data for processing (e.g., to calculate positioning, velocity or timing (PVT) information, or to decode communications content).

The system can be part of an AJ system (e.g., an anti jam antenna system (AJAS)), a GNSS-based system or a communications system. The system can be hosted or installed on a vehicle (e.g., any land-based, water-based, airborne or space vehicle, or an electric or autonomous vehicle), a satellite, a robotic entity, a building (e.g., station, communications center, command center), or on any operations platform (e.g., mobile operations center or module). Although portions of this disclosure may describe using the present systems and methods in the context of anti-jamming, this is merely by way of illustration and not intended to be limiting in any way. Embodiments of the present systems and methods can be used for any type of noise or interference mitigation.

Each of the above-mentioned elements or entities (and others disclosed herein) is implemented in hardware, or a combination of hardware and software. For instance, some of these elements or entities can include any application, program, library, script, task, service, process or any type and form of executable instructions executing on hardware of the system. The hardware includes circuitry such as one or more processors, memory devices, connections or bus structures, and/or communication interfaces, in one or more embodiments.

The antenna array 102 can include one or more antenna elements, which can be steerable. By way of illustration, two antenna elements are shown in FIG. 1 for simplicity. Each antenna element is coupled to its own receive chain along which a corresponding received signal is processed (e.g., in parallel with the processing of other received signals in the other receive chains). The antenna array 102 can be part of an AJAS. The antenna array 102 can receive any type of satellite or positioning signals, such as GNSS based signals which can include GPS, GLONASS, Galileo, Beidou and other regional systems' signals. A GNSS based signal can include a public, civilian, clear or open signal (e.g., a C/A code signal) and/or an encrypted signal (e.g., an M-code or Y-code signal, for military use for instance).

The antenna array can receive any type of communications signals using any communications protocol, such as one under wireless local area network (WLAN) or wireless fidelity (Wifi, e.g., any variant of IEEE 802.11 including 802.11a/b/g/n), wireless personal area network (WPAN, e.g., Bluetooth, Zigbee, ultra-wideband (UWB), WiMedia, Wibree, wireless universal serial bus, ONE-NET, etc.), cellular (e.g., CDMA/CDMA2000, GSM/UMTS, UMTS over W-CDMA, UMTS-TDD, LTE, 3G/4G/5G, and so on), wireless metropolitan area network WIMAN (e.g., WiMax), and other wide area network, WAN technologies (e.g., iBurst, Flash-OFDM, EV-DO, HSPA, RTT, EDGE, GPRS), LoRa, infrared (IR), radio frequency identification (RFID), Ethernet, optical (e.g., fiber, lightwave transmission, laser), ultrasonic, dedicated short range communications (DSRC), near field communication (NFC), radar, V2X, though not limited to these.

The antenna array 102 can be electronically steered. The antenna array 102 can operate with anti-jamming and/or interference removal mechanisms. For example, the spatial processor 112 can calculate spatial weights to steer the antenna array's antenna elements to null or remove jamming signals. The spatial weights can represent a solution for maximizing SINR (and/or satisfying other constraints, such as nulling a certain jammer, or limiting measurement errors below a threshold) for the antenna array 102. The system can use signal processing techniques such as space-frequency adaptive processing using FFTs for instance, to filter jamming or other interference signals from communications or positioning signals. The antenna array 102 can be controlled or configured to null, reduce or remove jamming and/or interference signals in a received GNSS signal for instance. The antenna array 102 can perform beamforming with its antenna elements to increase or improve reception of a desired signal.

Each antenna element of the antenna array 102 can receive an RF signal, which is transmitted to the RF front end component 106 in a receive chain. The incoming RF signal can be converted to digital signals through the ADC 106 in the receive chain, and are then converted from a serial stream of data to a block of data in a serial-to-parallel converter 108, for signal processing.

The signal processor 100 can include hardware such as circuitry and processing elements, as well as software such as TTT algorithms and/or spatial processing algorithms. The signal processor 100 can include TTT engines 110 (such as a FFT, wavelet or other time-domain to transform domain transform engine) for each receive chain, that can carry out TTT (e.g., FFT, wavelet or other TT transform). TTTs, such as FFTs, can be used for processing observed or received signals. Weighting functions, referred to as windows, can be applied to data in a received signal before TTT to reduce spectral leakage associated with the finite observation intervals. Windowing can achieve the effect of attenuating contribution from bins located several bins and beyond away from a current bin.

By way of an example, in applying a SFAP algorithm, an N point FFT of input data can be taken by the signal processor 100, resulting in N frequency bins. In each frequency bin, a set of weights can be calculated to remove the jamming power in a given frequency bin. In some embodiments, the TTT engine 110 of the signal processor 100 can perform a TTT where N points are taken resulting in N transform domain bins. When the TTT corresponds to wavelet transform, the transform domain bins can corresponds to bins in the scale domain and/or time domain (since Wavelet is a 2 dimensional transform to a scale domain and a time domain). The value of N may be determined or fixed based on a specific performance requirement, to address an expected type and/or level of jamming or interference. For a larger value of N, a longer time window is typically used to sample the signals, leading to more data for computational processing. For example, an AJ system may be implemented with 256, 512, 1024 or any other number of transform domain bins or sub-bands. In accordance with some aspects of the inventive concepts disclosed herein, the number of bins for TTT (and the corresponding hardware and/or software) can be designed for a defined number of bins (N), but the level of spatial processing can be adaptively adjusted using the underlying N bins in groups of M for instance. Hence, the system can implement a SFAP design that uses the highest number of bins (N) anticipated to mitigate a jamming threat space, and adjust spatial processing accordingly for adequate performance as the interference scenario changes.

The TTT engine 110 can produce data for each antenna element (or channel) of the antenna array 102. The spatial processor 112 can use the data corresponding to each antenna element to form a covariance matrix for each of the N bins. For instance, a covariance matrix of size K×K can be established for an antenna array 102 with K antenna elements. The covariance matrix can be indicative of a spatial orientation of jamming signal(s) relative to the antenna elements. The spatial processor 112 can establish covariance matrices for each of the N bins. The spatial processor 112 can establish N covariance matrices (sometimes referred to as covariances), one for each of the N bins. The spatial processor 112 can include a function for combining groups of covariances. The spatial processor 112 can perform a weighted combination of the covariance matrices into N/M spatial covariance matrices for instance. The spatial processor 112 can combine or sum groups of covariances. This can be one way to effectively change the number of bins used for spatial processing and provides a means to vary the resolution of spatial processing without changing the underlying TTT structure (of N bins).

The function or method for combining covariances can include a weighted combination of covariances. A weighted combination of covariances can include matrix addition, or entrywise sum, as shown below for example:

$$A + B = \begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix} + \begin{bmatrix} b_{11} & b_{12} & \cdots & b_{1n} \\ b_{21} & b_{22} & \cdots & b_{2n} \\ \vdots & \vdots & \ddots & \vdots \\ b_{m1} & b_{m2} & \cdots & b_{mn} \end{bmatrix}$$

$$= \begin{bmatrix} a_{11}+b_{11} & a_{12}+b_{12} & \cdots & a_{1n}+b_{1n} \\ a_{21}+b_{21} & a_{22}+b_{22} & \cdots & a_{2n}+b_{2n} \\ \vdots & \vdots & \ddots & \vdots \\ a_{m1}+b_{m1} & a_{m2}+b_{m2} & \cdots & a_{mn}+b_{mn} \end{bmatrix}$$

A weighted combination of covariances can include multiplying a weight to each matrix prior to addition, for example:

$$k \begin{bmatrix} a & b \\ c & d \end{bmatrix} + l \begin{bmatrix} A & B \\ C & D \end{bmatrix} = \begin{bmatrix} ka+lA & kb+lB \\ kc+lC & kd+lD \end{bmatrix}$$

where k and l are the applied weights.

Each group of matrices to be subject to weighted combination can include any number of matrices selected from the N covariance matrices. For example, M can be any integer that is 2 or larger. M can be such that N can be divisible by M to yield an integer. Each group of matrices can be matrices of M adjacent bins, or of M bins that are proximate to each other. In some embodiments, instead of a fixed number M, the groups of matrices can have variable group sizes, for instance ranging from 1 to 5 (or some other number of) matrices. As an example, the groupings can correspond to adjacent bins grouped as follows: first 2 bins in group 1, next 3 bins in group 2, next 1 bin in group 3, next 3 bins in group 4, and so on. Adjacent bins can be grouped to take advantage of the fact that data in adjacent bins are more closely related, and/or that adjacent bins are correlated due to windowing. Other types of grouping can be performed as well, e.g., first M even-numbered bins, first M odd-number bin, next M even-numbered bins, and so on. In some implementations, N does not have to be exactly divisible by M. For instance, one or more bins can be included in at least two different groups of covariances. In another example, at least one group of covariances may have less than or more than M covariances.

For example, the spatial processor 112 can perform weighted combination of adjacent groups of 2 covariances in a 256 bin design to provide performance comparable to 128 bin SFAP. The performance can actually be better than 128 bins SFAP due to the characteristics of the 256 bin TTT (e.g., FFT) window.

The amount of weighted combination or summation (e.g., the value of M) or the amount of spatial processing can be controllable, and can be updated or adjusted in real-time. Real-time control of the number of bins (or number of spatial covariance matrices) for spatial processing can be achieved by monitoring the performance of the system in real-time. The spatial processor 112 can be updated to for instance to use a fewest number of bins for which an expected or defined minimum level of system performance can be met. Performance metrics used to make the determination can be unique to the type of system in which or with which one or more embodiments of the present systems and methods are being used (e.g., GNSS or communications receiver). Increasing M can lead to a lower number of computations for the spatial weights, as the overall number of weights to be computed can be lower due to the combination of covariances. In a complex jamming scenario which can require more granular spatial processing, the value of M can be adjusted to a lower value, to increase the number of bins or resolution for spatial processing.

In one illustrative case, a spatial-only covariance can be generated by summing up the covariances from all bins. This spatial-only covariance can be provided to direction finding algorithms such as those using STAP.

The spatial processor 122 can incorporate an adaptive weight solver that can perform calculations for the maximum number of bins (N), that can also be throttled back when covariance weighted combination is active, in order to reduce power. The spatial processor 122 can use its adaptive weight solver to calculate spatial weights corresponding to each of the spatial covariance matrices. The spatial weights solved for a particular combined spatial covariance matrix can for example be applied to each bin associated with the group of covariances from which the combined spatial covariance matrix is formed. The spatial weights can be used for anti-jamming or interference mitigation processing in the spatial processor 112, to electronically configure, steer or adjust the antenna array 102. In addition, the spatial weights can be applied to antenna data in respective ones of the N bins, and an inverse TTT (e.g., ITTT) can be performed by the ITTT engine 114 based on the N bins for example, to provide data in the time domain. The data in the time domain can be used or processed by a receiver 116. For example, the receiver 116 can include a GNSS receiver, and the data in the time domain can include GNSS data such as C/A code, Y-code and/or M-code data. The GNSS receiver can process the data to generate PNT or PVT information for example. As another example, the receiver 116 can include a communications receiver, and the data in the time domain can include satellite communications or other communications data. The GNSS receiver can process and/or decode the data to output communications content (e.g., satellite phone audio transmission) to a user for example.

In some embodiments, the system can incorporate a higher resolution second stage (e.g., excision or filtering stage) in the SFAP processing, provided by the excision component 118 for instance. For example, the spatial processor 122 can baseline with an N (e.g., 1024) bin design to enable the second stage to match the filtering resolution (e.g., 1024 bins) in an excision process exactly, without requiring spatial weight solving in each of the N bins in the first stage of spatial processing (e.g., spatial weights can be solved at less than N bins) at the spatial processor 112. As such, embodiments of the present systems and methods can support flexible architectures in SFAP where the stage 1 and stage 2 processing can have differing numbers of bins.

Figure 2:
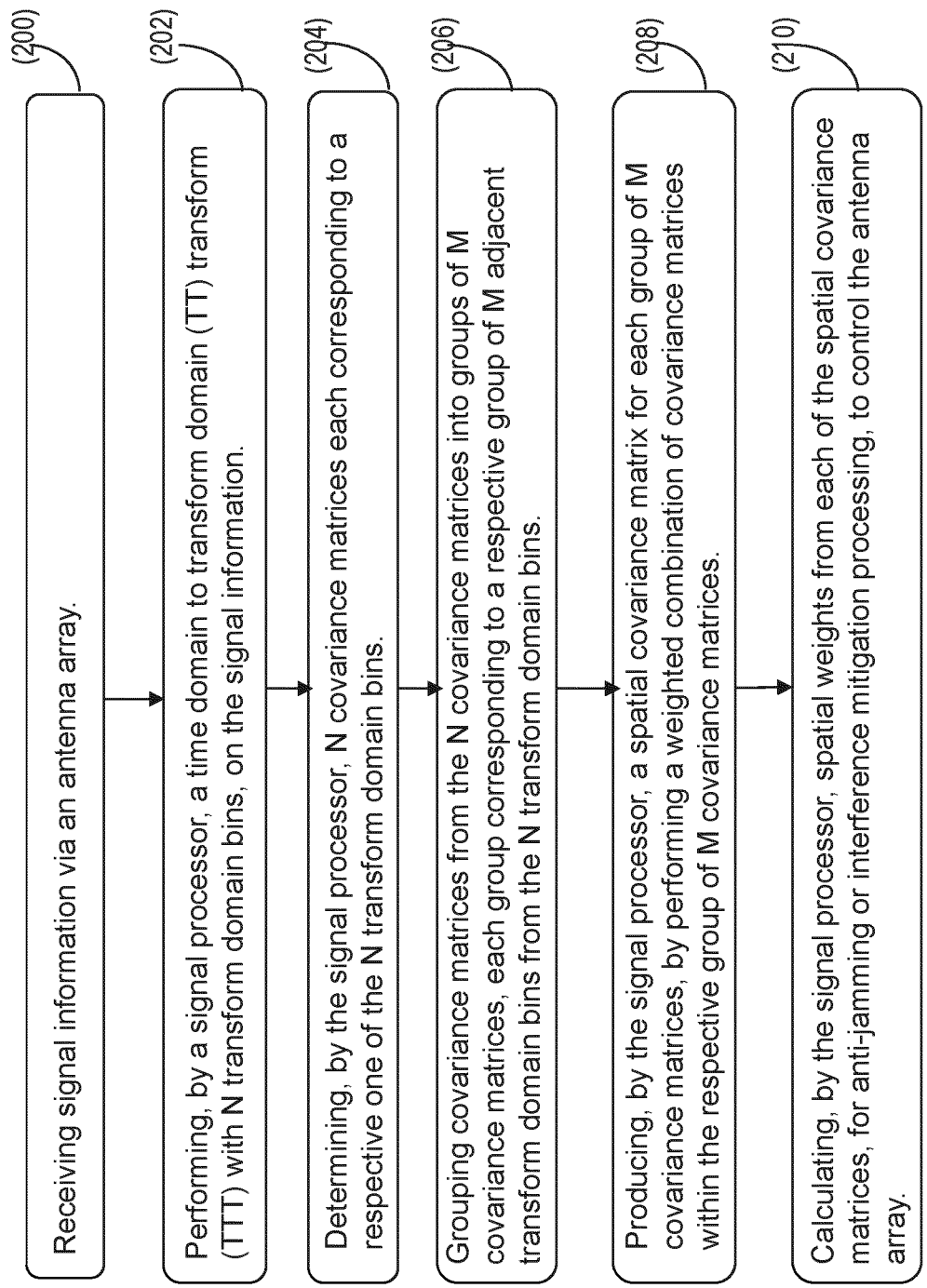
FIG. 2 shows a flow diagram of an example embodiment of a method for signal processing in accordance with some embodiments of the inventive concepts disclosed herein.

Referring now to FIG. 2, one embodiment of a method for managing global navigation satellite system (GNSS) receivers is depicted. The method includes receiving signal information via an antenna array (200). A signal processor can perform a time domain to transform domain transform with N transform domain bins, on the signal information (202). The signal processor can determine N covariance matrices each corresponding to a respective one of the N transform domain bins (204). The signal processor can group covariance matrices from the N covariance matrices into groups of M covariance matrices, each group corresponding to a respective group of M adjacent transform domain bins from the N transform domain bins (206). The signal processor can produce a combined spatial covariance matrix for each group of M covariance matrices, by performing a weighted combination of covariance matrices within the respective group of M covariance matrices (208). The signal processor can calculate spatial weights from each of the spatial covariance matrices, for anti-jamming or interference mitigation processing, to control or steer the antenna array (210).

Referring now to step 200, and in some embodiments, an antenna array can receive signal information. For example, the antenna array can receive the signal information in a positioning signal such as a global navigation satellite system (GNSS) signal, or in a communications signal. The antenna array 102 can receive any type of satellite or positioning signals, such as GNSS based signals which can include GPS, GLONASS, Galileo, Beidou and other regional systems' signals. The antenna array can receive any type of communications signals using any communications protocol. The antenna array can receive the signal information in one or more radio frequency (RF) signals. Each antenna element of the antenna array can receive an incoming RF signal. RF circuitry coupled to the corresponding antenna element, such as a RF front end component, can receive and process the incoming RF signal. An analog to digital converter (ADC) can convert an analog signal from the RF circuitry into a digital signal, which is then converted from a serial stream of data to a block of data in a serial-to-parallel converter 108, for signal processing. Each antenna element can be coupled to its own receive chain, along which a corresponding received signal is processed (e.g., in parallel with the processing of other received signals in the other receive chains).

Referring now to step 202, and in some embodiments, a signal processor can perform a time domain to transform domain transform (TTT) with N transform domain bins, on the signal information. The signal processor 100 can perform the TTT (e.g., a FFT or wavelet transform) on the digital signal. The signal processor 100 can include TTT engines 110 for each receive chain, that can each carry out a TTT such as a fast Fourier transform (FFT), in which N points are taken resulting in N frequency bins. Weighting functions, referred to as windows, can be applied to data in a received signal before TTT to reduce spectral leakage associated with the finite observation intervals. Each TTT engine 110 of the signal processor 100 can perform a TTT where N points are taken resulting in N transform domain bins. The value of N may be determined or fixed based on a specific performance requirement, to address expected types and/or levels of jamming or interference.

Referring now to step 204, and in some embodiments, the signal processor can determine N covariance matrices each corresponding to a respective one of the N transform domain bins. The spatial processor 112 can establish covariance matrices for each of the N bins. The signal processor can include a spatial processor 112 that can establish covariance matrices for each of the N bins. The TTT engine 110 can produce data for each antenna element (or channel) of the antenna array 102. The spatial processor 112 can use the data corresponding to each antenna element to form a covariance matrix for each of the N bins. For instance, a covariance matrix of size K×K can be established for an antenna array 102 with K antenna elements. The covariance matrix can be indicative of a spatial orientation of jamming signal(s) relative to the antenna elements.

Referring now to step 206, and in some embodiments, the signal processor can group covariance matrices from the N covariance matrices into groups of M covariance matrices. Each group can correspond to a respective group of M adjacent transform domain bins from the N transform domain bins. A user or an algorithm (e.g., using a feedback system) can set a value for M to achieve a desired minimum level of system performance.

Each group of matrices can include any number of matrices selected from the N covariance matrices. For example, M can be any integer that is 2 or larger. M can be such that N can be divisible by M to yield an integer. Each group of matrices can be matrices of M adjacent bins, or of M bins that are proximate to each other. Instead of a single value for M, the signal processor can group covariance matrices from the N covariance matrices into groups of variable numbers of covariance matrices, in some embodiments. Adjacent bins can be grouped to take advantage of the fact that data in adjacent bins are more closely related, and/or that adjacent bins are correlated due to windowing. Other types of grouping can be performed as well, e.g., first M even-numbered bins, first M odd-number bin, next M even-numbered bins, and so on. In some implementations, N does not have to be exactly divisible by M. For instance, one or more bins can be included in at least two different groups of covariances. In another example, at least one group of covariances may have less than or more than M covariances.

Referring now to step 208, and in some embodiments, the signal processor can produce a combined spatial covariance matrix for each group of M covariance matrices, by performing a weighted combination of covariance matrices within the respective group of M covariance matrices. The spatial processor 112 can include a function for combining groups of covariances. The spatial processor 112 can combine or sum groups of covariances. The spatial processor 112 can perform a weighted combination of the covariance matrices into M spatial covariance matrices. The spatial processor 112 can establish a number of spatial covariance matrices, each obtained by performing a weighted combination of covariance matrices within a corresponding group of M (or other number of) covariance matrices. This can effectively change the number of bins used for spatial processing and provides a means to vary the resolution of spatial processing without changing the underlying TTT structure (of N bins). The function or method for combining covariances can include a weighted combination of covariances. A weighted combination of covariances can include matrix addition, or entrywise sum. A weighted combination of covariances can include multiplying a weight to each matrix prior to addition.

Referring now to step 210, and in some embodiments, the signal processor can calculate spatial weights from each of the spatial covariance matrices, for anti-jamming or interference mitigation processing, to control or steer the antenna array. The spatial processor 112 can calculate spatial weights corresponding to each of the spatial covariance matrices. The spatial processor 122 can use an adaptive weight solver to calculate spatial weights corresponding to each of the spatial covariance matrices. The spatial weights can represent a solution for maximizing SINR (and/or satisfying a certain constraint) for the antenna array 102.

The antenna elements of the antenna array can be digitally steered according to the anti-jamming or interference mitigation processing (e.g., using the spatial weights). For example, the antenna array 102 can be steered, controlled or configured to null, reduce or remove jamming and/or interference signals in a received GNSS signal by using the spatial weights. The antenna array 102 can be digitally controlled or steered to perform beamforming with its antenna elements so as to increase or improve reception of a desired signal.

The spatial weights solved for a particular combined spatial covariance matrix can be applied to transform domain (e.g., frequency domain) data corresponding to the N bins. The spatial weights solved for a particular combined spatial covariance matrix can for example be applied to each bin associated with the group of covariances from which the combined spatial covariance matrix is formed, for example, before excision and/or an inverse TTT is performed. The spatial weights can be applied to data in respective ones of the N bins, and an inverse TTT (e.g., IFFT) can be performed by the ITTT engine 114 based on the N bins, to provide data in the time domain to be processed or used by a GNSS receiver for instance.

In some embodiments, the system can incorporate a higher resolution second stage, which corresponds to an excision or filtering stage. An excision component 118 can filter a result of the anti-jamming or interference mitigation processing, for example on antenna data from the bins after the spatial weights have been applied, at a resolution matched to the N bins. For instance, the spatial weights can be applied to data in the corresponding N bins, and the filtering can be performed on the data at a resolution matched to the N bins. This second stage can be optional and can be performed prior to the inverse TTT, for example.

The signal processing device can include an ITTT engine to perform the inverse TTT (ITTT) with N bins, using the calculated spatial weights. The ITTT engine 114 can generate data in the time domain, that includes C/A code, Y-code or M-code data for example, to feed to a GNSS receiver 116 to obtain positioning, navigational and timing (PNT) information for instance. The ITTT engine can generate data in the time domain, that includes a communications signal in a particular communications protocol for example, to feed to a communicates receiver 116 to decode and extract content from the communications signal for instance.

The amount of weighted combination or summation (e.g., the value of M) or the amount of spatial processing can be controllable, and can be updated or adjusted in real-time based on monitoring the system performance or under control of an external user of the system. For instance, the signal processing device can control the antenna array using a first value for M at a first time instance, and a second value for M at a second time instance that is later than the first time instance. Where the first value is lower than the second value, this increase can be to implement an adjustment to the spatial processing to reduce a resolution of spatial processing to a level that still meets a desired performance requirement under reduced complexity jamming conditions. Where the first value is higher than the second value, this increase can be to implement an adjustment to the spatial processing to increase a resolution of the spatial processing to a level that meets a desired system performance under increased complexity jamming conditions.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The present disclosure contemplates methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for signal processing, comprising:
   an antenna array configured to receive signal information; and
   a signal processing device comprising one or more processors, the signal processing device configured to:
   perform a wavelet transform with N transform domain bins, on the signal information;
   determine N covariance matrices each corresponding to a respective one of the N transform domain bins;
   group covariance matrices from the N covariance matrices into groups of M covariance matrices, each group corresponding to a respective group of M adjacent transform domain bins from the N transform domain bins;
   produce a combined spatial covariance matrix for each group of M covariance matrices, by combining covariance matrices within the respective group of M covariance matrices; and
   calculate spatial weights from each of the spatial covariance matrices, for anti-jamming or interference mitigation processing to control the antenna array.

2. The system of claim 1, wherein the antenna array is configured to receive the signal information in a radio frequency (RF) signal, the system further comprising:
   an analog to digital converter (ADC) configured to convert an analog signal from RF circuitry coupled to the antenna array, into a digital signal, wherein the signal processing device is configured to perform the wavelet transform on the digital signal.

3. The system of claim 1, wherein the antenna array is configured to receive the signal information in a global navigation satellite system (GNSS) signal.

4. The system of claim 1, wherein the signal processing device is configured to control the antenna array using a first value for M at a first time instance, and a second value for M at a second time instance.

5. The system of claim 1, wherein the signal processing device is configured to set or receive a value for M in response to a level of interference detected in signals received via the antenna array.

6. The system of claim 1, wherein the signal processing device is configured to perform an inverse wavelet transform with N bins.

7. The system of claim 1, wherein antenna elements of the antenna array are steered or controlled according to the calculated spatial weights.

8. The system of claim 1, further comprising an excision component configured to filter a result of the anti-jamming or interference mitigation processing, at a resolution matched to N bins.

9. A method for interference mitigation, comprising:
   receiving signal information via an antenna array;
   performing, by a signal processor, a wavelet transform with N transform domain bins, on the signal information;
   determining, by the signal processor, N covariance matrices each corresponding to a respective one of the N transform domain bins;
   grouping covariance matrices from the N covariance matrices into groups of M covariance matrices, each group corresponding to a respective group of M adjacent transform domain bins from the N transform domain bins;
   producing, by the signal processor, a combined spatial covariance matrix for each group of M covariance matrices, by combining covariance matrices within the respective group of M covariance matrices; and
   calculating, by the signal processor, spatial weights from each of the spatial covariance matrices, for anti-jamming or interference mitigation processing, to control the antenna array.

10. The method of claim 9, comprising:
    receiving, by the antenna array, the signal information in a radio frequency (RF) signal;
    converting, by an analog to digital converter (ADC), an analog signal from RF circuitry coupled to the antenna array, into a digital signal; and
    performing, by the signal processor, the wavelet transform on the digital signal.

11. The method of claim 9, comprising receiving, by the antenna array, the signal information in a global navigation satellite system (GNSS) signal.

12. The method of claim 9, comprising controlling, by the signal processor, the antenna array using a first value for M at a first time instance, and a second value for M at a second time instance.

13. The method of claim 9, comprising setting a value for M in response to a level of interference detected in signals received via the antenna array.

14. The method of claim 9, comprising performing, by the signal processor, an inverse wavelet transform with N bins.

15. The method of claim 9, comprising steering antenna elements of the antenna array according to the calculated spatial weights.

16. The method of claim 9, comprising filtering, by an excision component, a result of the anti-jamming or interference mitigation processing, at a resolution matched to the N bins.

17. A method for interference mitigation, comprising:
receiving signal information via an antenna array;
performing, by a signal processor, a fast Fourier transform (FFT) with N transform domain bins, on the signal information;
determining, by the signal processor, N covariance matrices each corresponding to a respective one of the N transform domain bins;
grouping covariance matrices from the N covariance matrices into groups of M covariance matrices, each group corresponding to a respective group of M adjacent transform domain bins from the N transform domain bins;
producing, by the signal processor, a combined spatial covariance matrix for each group of M covariance matrices, by combining covariance matrices within the respective group of M covariance matrices; and
calculating, by the signal processor, spatial weights from each of the spatial covariance matrices, for anti-jamming or interference mitigation processing, to control the antenna array.

18. The method of claim 17, comprising:
receiving, by the antenna array, the signal information in a radio frequency (RF) signal;
converting, by an analog to digital converter (ADC), an analog signal from RF circuitry coupled to the antenna array, into a digital signal; and
performing, by the signal processor, the FFT on the digital signal.

19. The method of claim 17, comprising receiving, by the antenna array, the signal information in a global navigation satellite system (GNSS) signal.

20. The method of claim 17, comprising controlling, by the signal processor, the antenna array using a first value for M at a first time instance, and a second value for M at a second time instance.

* * * * *